US012613448B2

(12) United States Patent
Kyoseva et al.

(10) Patent No.: US 12,613,448 B2
(45) Date of Patent: Apr. 28, 2026

(54) DETUNING MODULATED COMPOSITE PULSES FOR HIGH-FIDELITY ROBUST QUANTUM CONTROL

(71) Applicant: Ramot at Tel-Aviv University Ltd., Tel-Aviv (IL)

(72) Inventors: Elica Kyoseva, Tel-Aviv (IL); Hadar Greener, Tel-Aviv (IL); Haim Suchowski, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 0 days.

(21) Appl. No.: 18/424,979

(22) Filed: Jan. 29, 2024

(65) Prior Publication Data

US 2024/0249171 A1      Jul. 25, 2024

Related U.S. Application Data

(63) Continuation of application No. 17/284,509, filed as application No. PCT/IL2019/051132 on Oct. 18, 2019, now Pat. No. 11,922,273.

(60) Provisional application No. 62/747,222, filed on Oct. 18, 2018.

(51) Int. Cl.
   *G02F 3/00*          (2006.01)
   *G02B 6/12*          (2006.01)
(52) U.S. Cl.
   CPC ................ *G02F 3/00* (2013.01); *G02B 6/12* (2013.01)
(58) Field of Classification Search
   CPC ................................. G06N 10/00; G02B 6/12

USPC .......................................................... 716/100
See application file for complete search history.

(56) References Cited

U.S. PATENT DOCUMENTS

| | | | | |
|---|---|---|---|---|
| 10,352,992 | B1 * | 7/2019 | Zeng ...................... | G06N 10/20 |
| 10,467,544 | B2 * | 11/2019 | Filipp .................... | G06N 10/40 |
| 10,468,740 | B2 * | 11/2019 | Minev ..................... | H01P 7/065 |
| 10,879,446 | B2 * | 12/2020 | Caudillo ................ | H10N 60/12 |
| 11,320,588 | B1 * | 5/2022 | Mazed ................... | G06N 10/40 |
| 11,321,627 | B1 * | 5/2022 | Arriola .................. | H03K 17/92 |

(Continued)

FOREIGN PATENT DOCUMENTS

| | | | |
|---|---|---|---|
| RU | | 124446 | 1/2013 |
| RU | | 124446 U1 * | 1/2013 |

(Continued)

OTHER PUBLICATIONS

International Search Report and the Written Opinion Dated Feb. 25, 2020 From the International Searching Authority Re. Application No. PCT/IL2019/051132. (14 Pages).

(Continued)

*Primary Examiner* — Suresh Memula

(57)          ABSTRACT

A method for robust state manipulation in quantum information processing comprises evanescently coupling a first waveguide to a second waveguide, the first and second waveguide having different geometries respectively; and providing waveguide geometries such that their coupling is detuned, the detuning being a function of the geometries, the detuned coupling thereby providing reliable population transfer between the first and second waveguides that is robust to fabrication and other errors. The method may be used to provide a quantum optical coupler.

Figures 1A, 1B, 2:
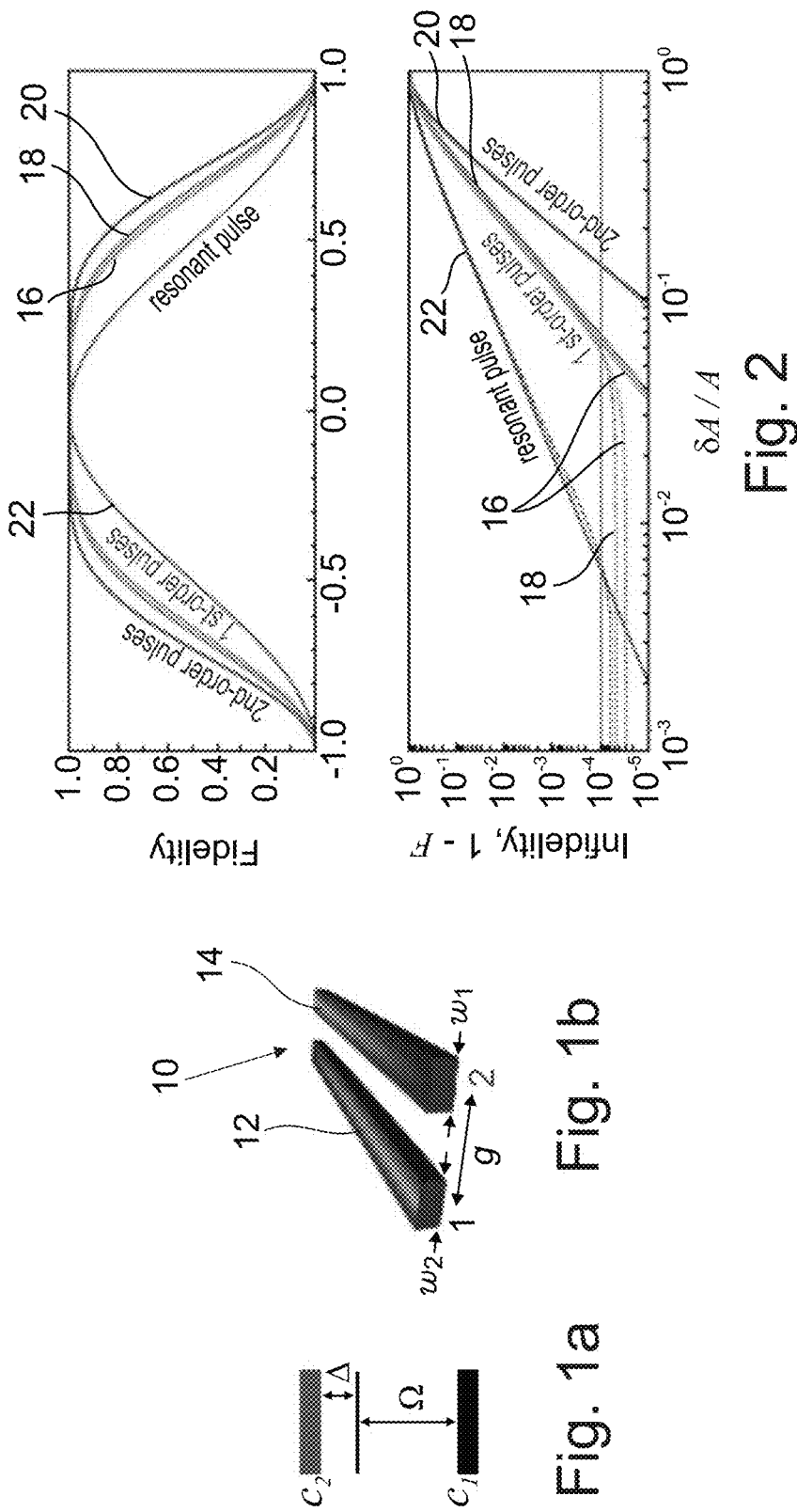

5 Claims, 6 Drawing Sheets
(5 of 6 Drawing Sheet(s) Filed in Color)

(56)  References Cited

U.S. PATENT DOCUMENTS

| | | | | |
|---|---|---|---|---|
| 2009/0074355 | A1* | 3/2009 | Beausoleil | H10F 77/14 |
| | | | | 385/27 |
| 2009/0092354 | A1* | 4/2009 | Joyner | G02B 6/12004 |
| | | | | 385/14 |
| 2012/0301071 | A1* | 11/2012 | Kung | G02F 1/225 |
| | | | | 385/9 |
| 2013/0256504 | A1* | 10/2013 | Stevenson | G02F 1/2257 |
| | | | | 250/201.1 |
| 2014/0167836 | A1* | 6/2014 | Gambetta | H03K 19/195 |
| | | | | 327/528 |
| 2016/0085025 | A1 | 3/2016 | Suchowski et al. | |
| 2016/0300155 | A1* | 10/2016 | Betz | H10D 64/27 |
| 2017/0091647 | A1* | 3/2017 | Abdo | G01R 29/0807 |
| 2019/0042968 | A1* | 2/2019 | Lampert | H10D 48/383 |
| 2020/0348579 | A1* | 11/2020 | Heuck | G02F 3/00 |
| 2021/0296558 | A1* | 9/2021 | Englund | G06N 10/70 |
| 2021/0374592 | A1 | 12/2021 | Kyoseva et al. | |
| 2021/0406746 | A1* | 12/2021 | Stehlik | G06N 10/40 |
| 2021/0408112 | A1* | 12/2021 | Finck | H03K 19/017545 |
| 2022/0156443 | A1* | 5/2022 | Chamberland | G06N 10/00 |

FOREIGN PATENT DOCUMENTS

| | | | | |
|---|---|---|---|---|
| WO | WO 2005/096774 | 10/2005 | | |
| WO | WO 2008/022071 | 2/2008 | | |
| WO | WO-2008022071 | A2 * | 2/2008 | ....... H04B 10/25752 |
| WO | WO 2020/079695 | 4/2020 | | |

OTHER PUBLICATIONS

Notice of Allowance Dated Oct. 30, 2023 from the US Patent and Trademark Office Re. U.S. Appl. No. 17/284,509. (3 pages).

Official Action Dated Jul. 7, 2023 from the US Patent and Trademark Office Re. U.S. Appl. No. 17/284,509. (13 pages).

Supplementary European Search Report and the European Search Opinion Dated Jul. 29, 2022 From the European Patent Office Re. Application No. 19873522.7. (11 Pages).

Genov et al. "Optimized Control of Multistate Quantum Systems by Composite Pulse Sequences", Physical Review A, 84(6): 063413-1-063413-10, Published Online Dec. 14, 2011.

Ho et al. "Optimization of Adiabaticity in Coupled-Waveguide Devices Using Shortcuts to Adiabaticity", Optics Letters, XP055943540, 40(21): 4831-4834, Published Online Sep. 14, 2015.

Kyoseva et al. "Detuning-Modulated Composite Pulses for High-Fidelity Robust Quantum Control", Physical Review A, 100(3): 032333-1-032333-6, Sep. 25, 2018.

Torosov et al. "Robust High-Fidelity Coherent Control of Two-State Systems by Detuning Pulses", ArXiv Preprint ArXiv:1810.03832v1, XP081059071, p. 1-8, Oct. 9, 2018.

Tseng "Robust Coupled-Waveguide Devices Using Shortcuts to Adiabaticity", Optics Letters, XP001592837, 39(23): 6600-6603, Dec. 1, 2014.

Lu et al. "Broadband Silicon Photonic Directional Coupler Using Asymmetric-Waveguide Based Phase Control", Optics Express, 23(3): 3795-3808, Published Feb. 6, 2015.

Communication Pursuant to Article 94(3) EPC Dated Jan. 14, 2026 From the European Patent Office Re. Application No. 19873522.7. (10 Pages).

* cited by examiner

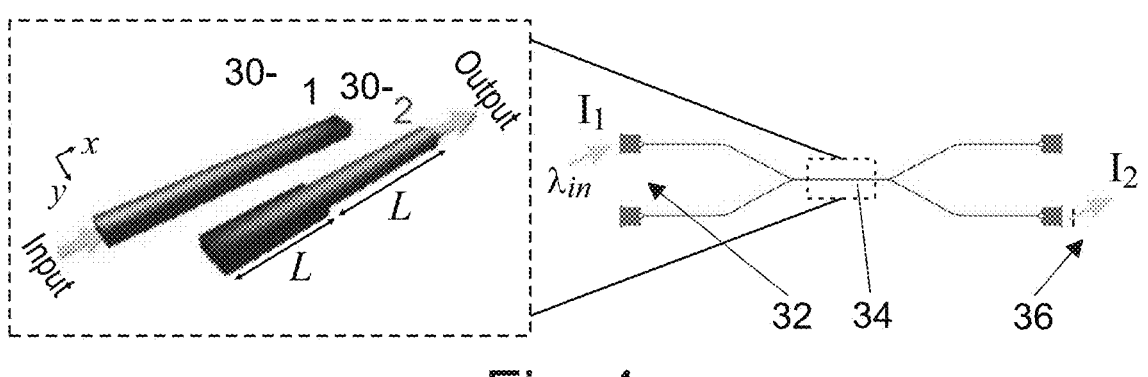
Fig. 4a
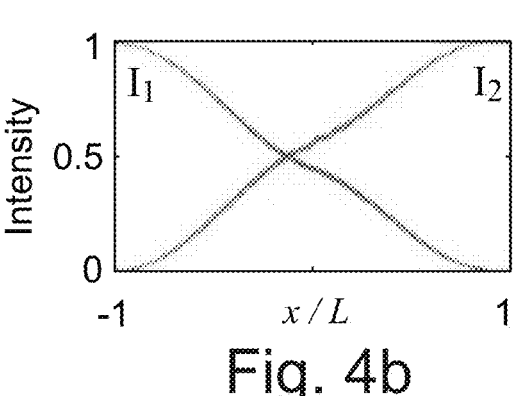
Fig. 4b
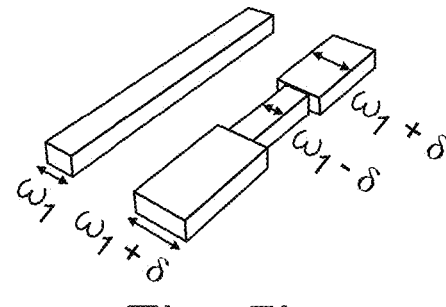
Fig. 4c
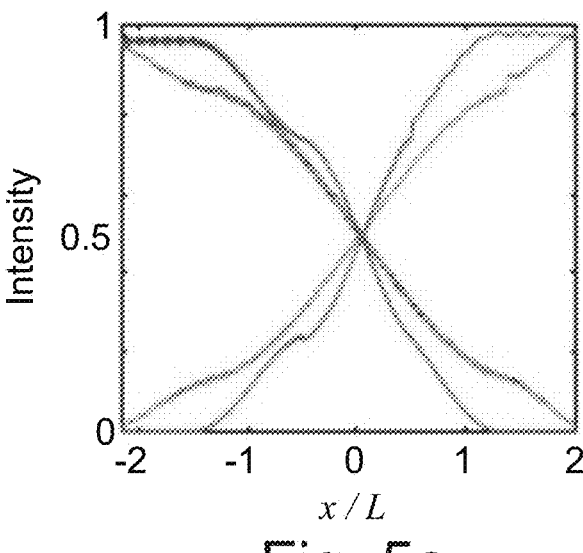
Fig. 5a
Fig. 5b
Fig. 5c Optical coupling for population and state transfer 40 — Obtain optical beam — e.g. from CW laser 42 — Optically couple two waveguides having different geometries 44 — Provide beam to the waveguides to detune the beam

DETUNING MODULATED COMPOSITE PULSES FOR HIGH-FIDELITY ROBUST QUANTUM CONTROL

RELATED APPLICATIONS

This application is a continuation of U.S. patent application Ser. No. 17/284,509, filed on Apr. 12, 2021, which is a National Phase of PCT Patent Application No. PCT/IL2019/051132 having International Filing Date of Oct. 18, 2019, which claims the benefit of priority under 35 USC § 119(e) of U.S. Provisional Patent Application No. 62/747,222 filed on Oct. 18, 2018. The contents of the above applications are all incorporated by reference as if fully set forth herein in their entirety.

FIELD AND BACKGROUND OF THE INVENTION

The present invention, in some embodiments thereof, relates to detuning of modulated composite pulses for high-fidelity robust quantum control.

Quantum information processing (QIP) relies on high-fidelity quantum state preparation and transfer. This presents a challenge in practical realizations of QIP where the admissible error of quantum operations is smaller than $10^{-4}$. Thus, even small systematic errors, i.e. due to imperfections in fabrication or in the experimental control knobs, reduce the fidelity of state transfer below the fault-tolerant threshold. A powerful tool to correct for systematic errors are composite pulses (CPs), which were initially developed in the field of nuclear magnetic resonance and are applicable to photonic systems. A composite pulse is a sequence of pulses with different areas and/or phases that implement accurate and robust quantum gates. A single pulse is substituted by a sequence of pulses so as to provide more parameters to mitigate errors. To this end, CPs are designed for resonant or adiabatic interactions with complex coupling parameters and have successfully been used to achieve complete population transfer (CPT) in quantum systems in both radiofrequency (rf) and ultrashort pulsed excitations. However, such use until now has been with complex coupling parameters which cannot be realized in photonic systems. By contrast, in photonic quantum architectures the coupling is always real, and so far, composite pulses could have not been able to achieve the small operation error as required by quantum computing.

More recently, CPs have been applied in many physical realizations of QIP including trapped ions and atomic systems, and also to achieve accuracy in matching higher harmonic generation processes and in designing polarization rotators.

Another candidate for advancing QIP technologies is integrated photonic circuits due to their scalability and on-chip integration capacity. However, in the case of photonic circuits, a problem arises in that the fidelity of operations remains below the QIP threshold due to unavoidable fabrication errors. In any event, for photonics, real parameters are needed. An adiabatic design has been proposed as something that could work in theory, but such a system would need impractically long waveguides.

In other words, the advance of quantum technologies has given rise to an immediate need for feasible methods for precise state preparation and accurate state transfer. In recent years, integrated photonic circuits have emerged as a strong contender for quantum information processing (QIP) hardware due to their scalability and on-chip integration capacity. However, unavoidable fabrication errors lead to a significant decrease in the fidelity of light transfer and limit their integration in QIP applications.

SUMMARY OF THE INVENTION

The present embodiments may provide a control method for robust quantum information processing suited for quantum integrated photonics. The Present embodiments may utilize off-resonant detunings as the control parameters to derive a new family of composite pulses for high-fidelity population transfer that falls within the quantum error threshold of $10^{-4}$.

A general approach for precise quantum population transfer by N-piece detuning-modulated composite pulses, with minimal pulse overhead, may achieve high-fidelity broadband and robust population transfer even for an order as low as N=2. The suggested solution is inherently stable to all systematic parameters (coupling strength, pulse duration, resonance offsets errors, Stark shifts, unwanted frequency chirp, etc.), and thus will be a cornerstone for high-fidelity quantum operations for QIP. The term 'population transfer' as used herein refers to the use of photons to operate as a quantum gate—that is to say if we inject light in one waveguide then it gets transferred to the other waveguide, and reliable transfer may be achieved according to the present embodiments by engineering the waveguides so that they implement N-piece detuning modulated composite pulses. The engineering to allow such reliable transfer may include changing the widths of the waveguides relative to one another and changing the distance between them. Width of one waveguide relative to the other gives the detuning.

In the following, the present inventors implement various composite solutions in integrated photonics systems, allowing light transfer that is robust to fabrication errors.

According to an aspect of some embodiments of the present invention there is thus provided a control method for robust quantum information processing suited for quantum integrated photonics which uses off-resonant detunings as control parameters to derive a family of composite pulses for high-fidelity population transfer within the quantum error threshold.

According to a first aspect of the present invention there is provided a method for state transfer in photonic quantum information processing, comprising:

obtaining an optical beam;

optically coupling a first waveguide to a second waveguide, the first and second waveguide having different geometries respectively; and providing the beam to the optically coupled waveguides to detune the beam, the detuning being a function of the respectively different geometries, the detuned coupling thereby providing reliable population transfer between the first and second waveguides that preserves quantum states.

The method may comprise:

using the detuning to provide at least one control parameter;

using the control parameter to control quantum state preparation and population transfer within a quantum error threshold.

The method may use composite pulses to control for systematic errors and/or to provide quantum gates.

The method may carry out the state transfer at room temperature.

The method may use the state transfer as a form of quantum logic gate.

The method may set a coupling between the first and second waveguide by defining a distance between the first and second waveguides.

In an embodiment, the first waveguide has a first waveguide lengthwise axis and a constant cross-section along the first waveguide lengthwise axis, and the second waveguide has a second waveguide lengthwise axis. A cross section along the second waveguide lengthwise axis includes one or more step changes.

The cross section along the second waveguide lengthwise axis may for example include at least two step changes or at least three step changes.

The step changes may be located at predetermined locations along the second waveguide. The locations may be selected based on the materials and geometries being used. Furthermore, embodiments are able to define a pulse area for the beam by setting lengths between respective step changes along the second waveguide.

According to a second aspect of the present invention there is provided a coupler for quantum information processing, the coupler comprising:

a laser input;
   a first waveguide having a lengthwise direction and a constant cross-section along the lengthwise direction;
   a second waveguide having a lengthwise direction and a cross-section along the lengthwise direction having at least one step change, wherein the first and second waveguides are optically coupled with a predetermined coupling constant; and
   a detector for detecting output.

In an embodiments of the coupler, the step change comprises a plurality, say two, three, or four, of step changes.

The step change or changes may be placed at predetermined locations along the second waveguide, and the location(s) may be selected for any given material or geometry.

The coupling constant may be defined by a distance between the first and the second waveguides.

In the coupler, lengths between each step change may be used to define a pulse area of a beam provided by the laser.

The coupler may comprise a first grating between the input and the first and second waveguides, and a second grating between the first and second waveguides and a detector.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 3A:
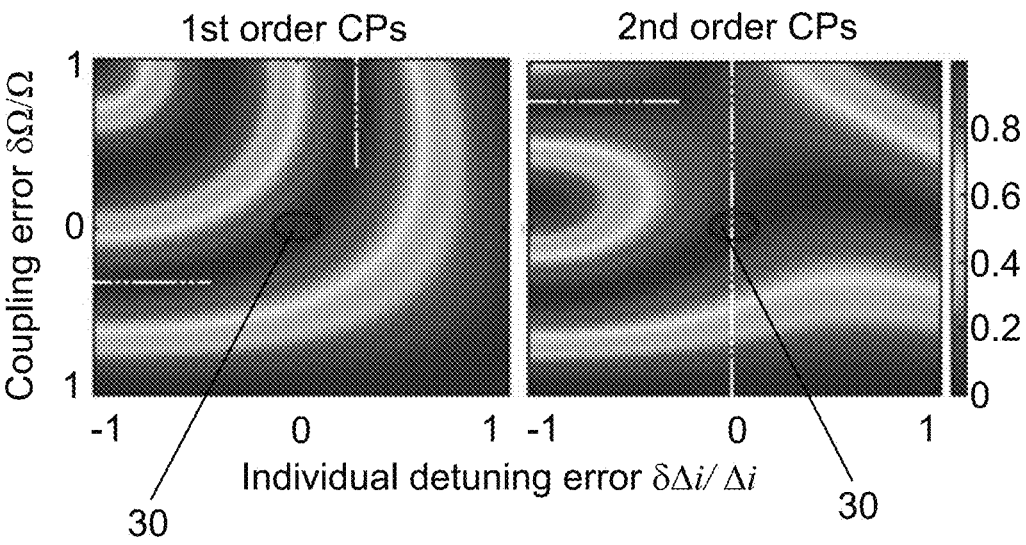
Figure 3B:
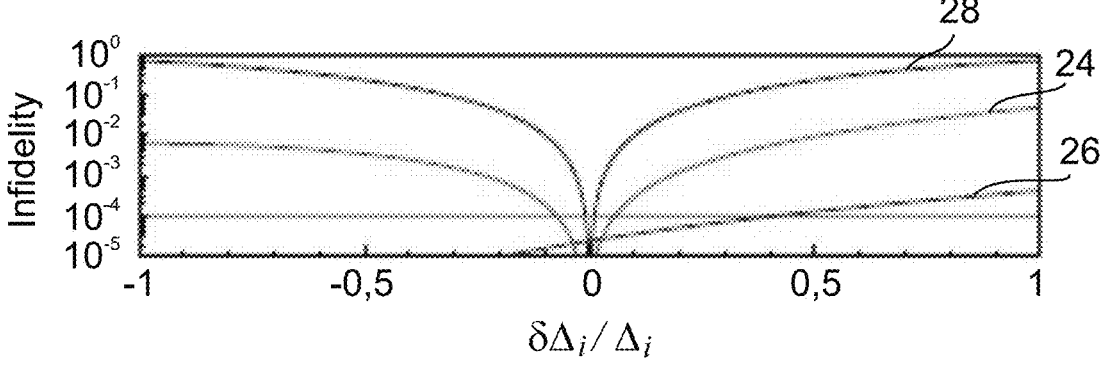
Figure 3C:
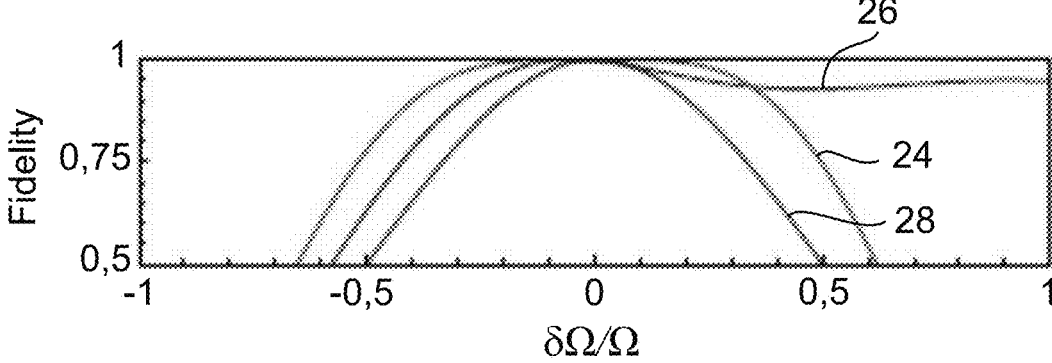
Figures 6A, 6B, 6C, 7A, 7B, 7C:
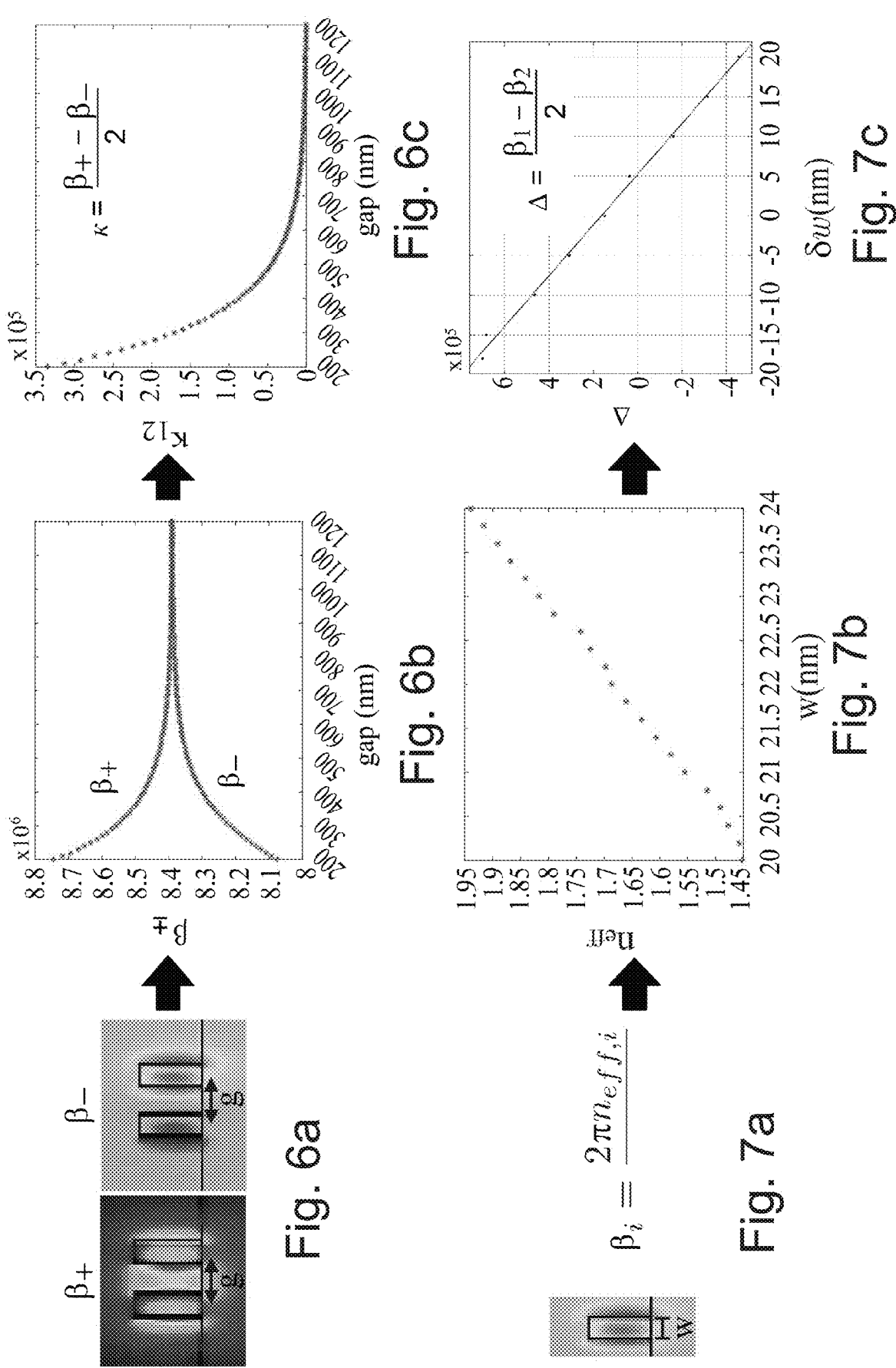
Figure 8D:
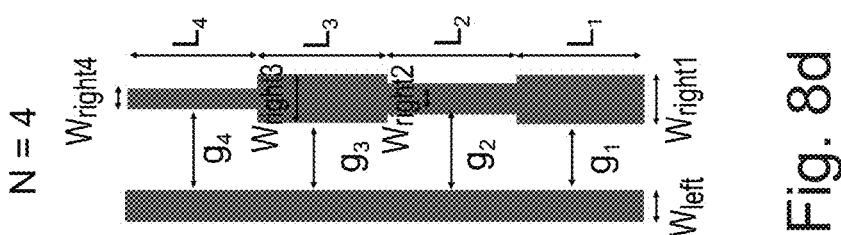
Figure 8C:
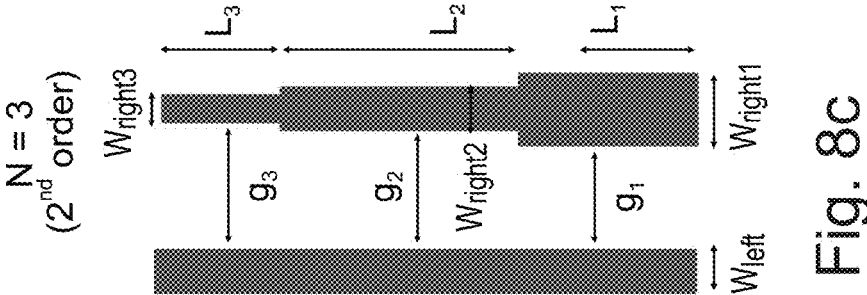
Figure 8B:
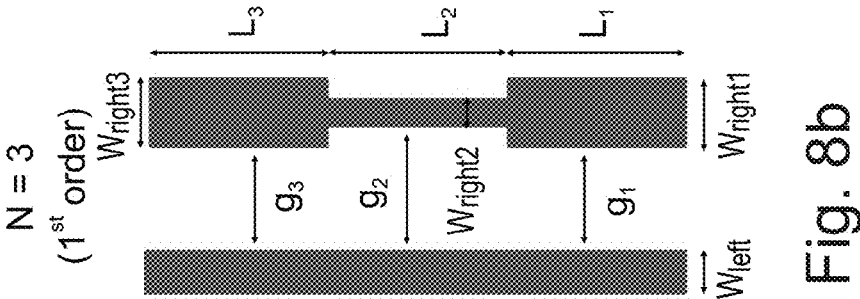
Figure 8A:
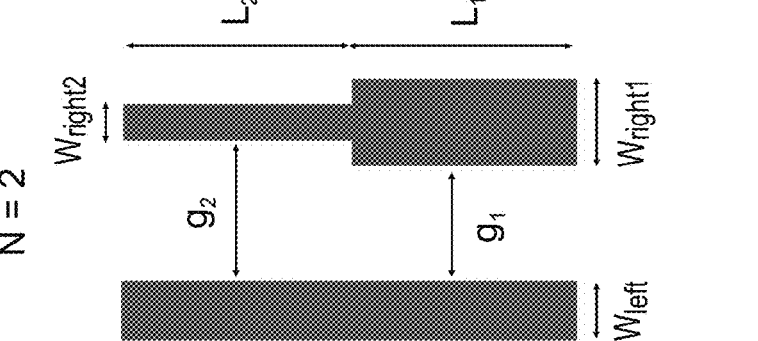
Figure 9:
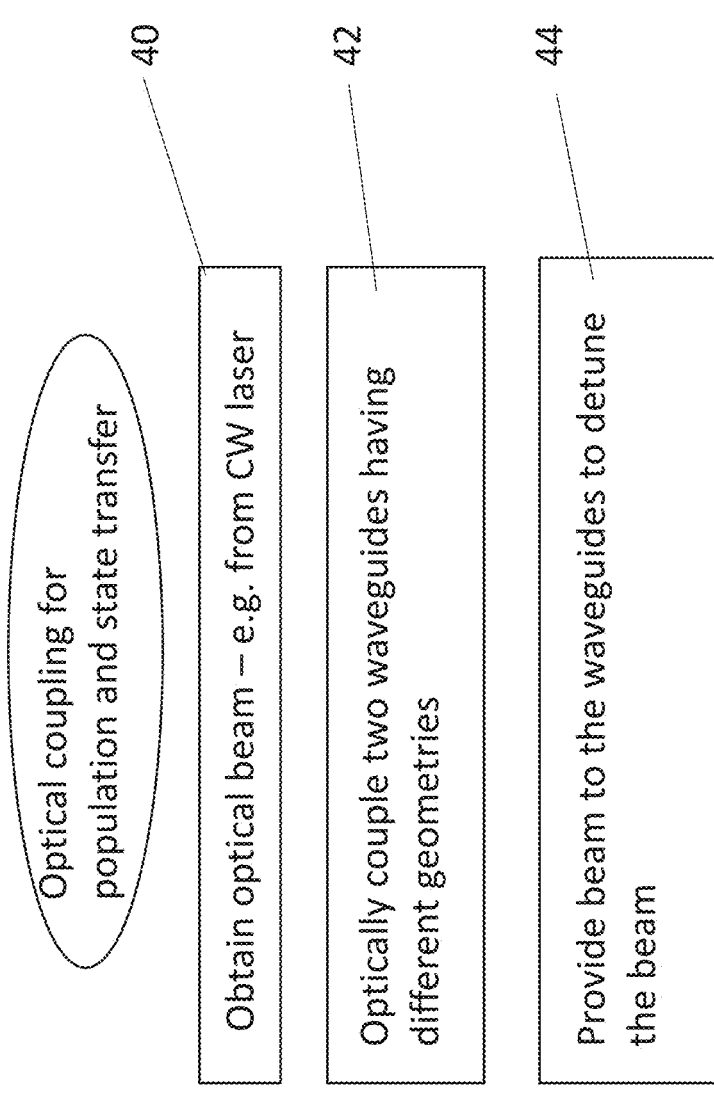

In the drawings:

FIGS. 1(a) and 1(b) are simplified diagrams of qubit dynamics in a two-state system and a directional coupler respectively according to embodiments of the present invention;

FIG. 2 is two graphs showing fidelity of the detuning-demodulated composite sequences according to embodiments of the present invention;

FIGS. 3(a)-3(c) are simplified graphs showing robustness of first and second order detuning-modulated sequences vs errors in the coupling and detuning according to embodiments of the present invention;

FIGS. 4(a)-4(c) show light transfer in first order N=2 detuning modulated composite coupled waveguides according to embodiments of the present invention;

FIGS. 5(a) to 5(c) are simplified diagrams showing a realization of first and second order detuning modulated CPs with N=3 in coupled waveguides according to an embodiment of the present invention;

FIGS. 6(a)-6(c) show a coupler and graphs of the coupling constant as a function of distance between the waveguides;

FIGS. 7(a)-7(c) show a coupler and the determination of the detuning parameters from;

FIGS. 8(a)-8(d) show examples of different geometries respectively for the two waveguides used in the coupler to achieve detuning; and FIG. 9 is a simplified diagram showing how to achieve detuning according to the present embodiments.

DESCRIPTION OF SPECIFIC EMBODIMENTS OF THE INVENTION

The present invention, in some embodiments thereof, relates to modulating the detuning of modulated composite pulses for high-fidelity robust quantum control.

Quantum information processing (QIP) relies on high-fidelity quantum state preparation and transfer. This presents a challenge in practical realizations of QIP where the admissible error of quantum operations is smaller than $10^{-4}$. Thus, even small systematic errors, for example due to imperfections in fabrication or in the experimental control knobs, reduce the fidelity of state transfer below the fault-tolerant threshold.

The present embodiments may provide a control method for robust quantum information processing suited for quantum integrated photonics that uses off-resonant detunings as control parameters to derive a family of composite pulses for high-fidelity population transfer within the quantum error threshold. The detuning-modulated N-piece composite sequences may correct for any control inaccuracies including pulse strength, duration, resonance offset errors, Stark shifts, unwanted frequency chirp, etc. The composite solutions are implemented in coupled waveguides and allow complete light transfer that is robust to fabrication errors.

More particularly, the present embodiments provide off-resonance detuning to provide a family of pulses. In the case of QIP in photonic circuits it is not possible to change the phase and thus the complex properties cannot be changed, which means that the complex coupling properties cannot be changed. Yet off-resonance detuning provides a property that can be changed in photonic circuits and may thus serve as a control parameter. Using off-resonance detuning to provide a family of pulses, provides a high fidelity quantum logic gate, and Quantum Information Processing needs the logic gates to be of very high fidelity. The gate error is required to be less than $10^{-4}$ and this is generally hard to achieve because of fabrication inaccuracies in waveguides etc. But the composite pulses based on off-resonance detuning allow the errors to be overcome. This is because the parameters can be used as an error mitigation scheme. The extra parameters allow for a more flat top function as shown in the upper graph in FIG. 2, which is discussed in greater detail below.

A powerful tool to correct for systematic errors is thus composite pulses (CPs), which were initially developed in the field of nuclear magnetic resonance. A composite pulse is a sequence of pulses with different areas and/or phases that implement accurate and robust quantum gates. To this end, CPs are designed for resonant or adiabatic interactions with complex coupling parameters and were successfully used to achieve complete population transfer (CPT) in quantum systems in both radiofrequency (rf) and ultrashort pulsed excitations. However as mentioned, a phase change is not readily available in the technology being discussed.

A candidate for advancing QIP technologies is integrated photonic circuits due to their scalability and on-chip integration capacity. The fidelity of operations remains below the QIP threshold due to unavoidable fabrication errors.

CPs have not been previously used to correct for such errors, as existing sequences require control of the phase of the coupling, and in integrated photonic circuits, the phase is a real parameter.

The present embodiments address this limitation and may derive CPs that can be used in any qubit architecture including integrated photonic systems, by varying an off-resonance detuning.

In the present disclosure, embodiments may provide a first composite sequences designed for off-resonant complete and robust qubit inversion without any constraints on the coupling parameters. Rather, the present solution relies on changing of other parameters, rather than the coupling parameters, specifically it is detuning parameters that may be changed. That is to say the desired high-fidelity population transfer may be achieved by suitably choosing detuning parameters while maintaining constant coupling. An approach is provided to derive detuning-modulated composite pulses of an arbitrary length N with a minimal pulse overhead and robust transfer.

The present embodiments may be inherently stable to inaccuracies in all systematic parameters, coupling strength, coupling duration and resonance offsets, and may achieve fidelities well above the QIP gate error threshold making it a cornerstone for high-fidelity quantum operations for QIP.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Firstly, as discussed above, CPs have not been previously used to correct for errors in quantum computing operations as existing sequences require control of the phase of the coupling, which in integrated photonic circuits is a real parameter. The present research thus derives CPs that can be used in any qubit architecture including integrated photonic systems.

In the present disclosure, we introduce the first composite sequences designed for off-resonant complete and robust qubit inversion without any constraints on the coupling strengths. We achieve the desired high-fidelity population transfer by suitably choosing the detuning parameters while maintaining constant coupling. An approach used in the present embodiments to derive detuning-modulated composite pulses of an arbitrary length N has a minimal pulse overhead, and robust transfer is realized even for N=2.

In the present analysis we consider a generic coupled two-state quantum system which has many possible physical realizations including atomic and photonic, and these are shown in FIGS. 1(a)-(b) to which reference is now made.

In greater detail, FIGS. 1(a) and 1(b) illustrate Qubit dynamics. FIG. 1(a) shows a two-state atomic system with ground state c1 and excited state c2 coupled via Rabi frequency and detuning. FIG. 1 (b) shows an optical directional coupler 10 comprising two waveguides 12 and 14 of widths $\omega_i$ at a distance apart g, and provides an embodiment that may be described as a two-state quantum system.

We show that implementation as practiced in the present embodiments may be inherently stable to inaccuracies in all systematic parameters, including coupling strength, coupling duration and resonance offsets, and may achieve fidelities well above the QIP gate error threshold, thus making it a cornerstone for high-fidelity quantum operations for QIP.

In the following description, a recipe is provided for generating embodiments to implement the presented detuning-modulated composite sequences in integrated photonic systems for broadband high fidelity optical switching.

Detuning-modulated composite pulses.

The time evolution of a qubit system {|1>, |2>}, as shown in FIG. 1 (a), is driven coherently by an external electromagnetic field that is governed by the Schrödinger equation $$ i\hbar \partial_t \begin{bmatrix} c_1(t) \\ c_2(t) \end{bmatrix} = \frac{\hbar}{2} \begin{bmatrix} -\Delta(t) & \Omega(t) \\ \Omega^*(t) & \Delta(t) \end{bmatrix} \begin{bmatrix} c_1(t) \\ c_2(t) \end{bmatrix} \tag{1} $$

Here, $[c_1(t), c_2(t)]^T$ is the probability amplitudes vector, $\Omega(t)$ is the Rabi frequency of the transition, and $\Delta(t) = \omega_0 - \omega$ is the real-valued detuning between the laser frequency $\omega$ and the Bohr transition frequency of the qubit $\omega_0$. In what follows, we assume $\Omega(t)$ and $\Delta(t)$ real and constant, which is well-suited for the foreseen implementation of our results in coupled waveguides and in optical elements for generating higher harmonics.

The unitary propagator of the time evolution governed by Eq. (1) is found according to $$ U(t, 0) = e^{-\frac{i}{\hbar} \int_0^t H(t)dt} \tag{2} $$

$$ U(\delta t) = \begin{bmatrix} \cos\left(\frac{A}{2}\right) + i\frac{\Delta}{\Omega_g}\sin\left(\frac{A}{2}\right) & -i\frac{\Omega}{\Omega_g}\sin\left(\frac{A}{2}\right) \\ -i\frac{\Omega}{\Omega_g}\sin\left(\frac{A}{2}\right) & \cos\left(\frac{A}{2}\right) - i\frac{\Delta}{\Omega_g}\sin\left(\frac{A}{2}\right) \end{bmatrix} $$

Here, $$ \Omega_g = \sqrt{\Omega^2 + \Delta^2} $$

is the generalized Rabi frequency and $A = \Omega_g \delta t$ is the pulse area with $\delta t = (t - t_0)$ being the pulse duration. The propagator $U(\delta t)$ evolves the state of the qubit from the initial time $t_0$ to the final time t according to $c(t)=U(\delta t)c(t_0)$. If the initial state of the qubit at $t_0$ is $|1\rangle$, the population of the excited state $|2\rangle$ at time t is found by the modulus squared of the off-diagonal propagator element $|U_{12}(\delta t)|^2$.

We assume a composite pulse sequence comprising N individual off-resonant pulses with Rabi frequencies $\Omega_N$ and detuning $\Delta_N$. Given the individual pulse propagator $U_N(\delta t_N)$ from Eq. (2), the propagator for the total composite pulse sequence is given by the product $$U^{(N)}(T, 0) = U_N(\delta t_N)U_{N-1}(\delta t_{N-1}) \ldots U_1(\delta t_1) \qquad (3)$$

where $\delta t_N=(t_N-t_{N-1})$ is the duration of the $n^{th}$ pulse ($t_0=0$ and $t_N\equiv T$). Without loss of generality, we focus on the case of individual $\pi$-pulses, i.e., $A_n=A=\pi$, which is easily realized by setting the pulse durations according to $\delta t_n=\pi/\Omega_{g,n}$.

N-Pulse Broadband Composite Sequences.

We require that the composite sequence produces complete qubit flip at the end of the evolution, that is, the modulus squared of the off-diagonal element from Eq. (3) is:

$$\left|U_{12}^{(N)}(T, 0)\right|^2 = 1$$

The exact form of the propagator element for an arbitrary N is provided and we use the set of detuning values $\{\Delta_n\}$ as control parameters and find that for a qubit flip they need to fulfil a general analytical condition depending on the value of N. For an even number of pulses N=2n that is $$1 + \sum_{i<j=1}^{2n}(-1)^{i+j+1}\frac{\Delta_i}{\Omega_i}\frac{\Delta_j}{\Omega_j} + \ldots + \sum_{i<\ldots<m=1}^{2n}(-1)^{i+\ldots+m+1}\underbrace{\frac{\Delta_i}{\Omega_i}\ldots\frac{\Delta_m}{\Omega_m}}_{2n\,times} = 0 \qquad (4)$$

while for an odd number of pulses N=(2n+1) it is, $$\sum_{i=1}^{2n+1}(-1)^{i+1}\frac{\Delta_i}{\Omega_i} + \sum_{i<j<k=1}^{2n+1}(-1)^{i+j+k+1}\frac{\Delta_i}{\Omega_i}\frac{\Delta_j}{\Omega_j}\frac{\Delta_k}{\Omega_k} + \qquad (5)$$

$$\ldots + \sum_{i<\ldots<m=1}^{2n+1}(-1)^{i+\ldots+m+1}\underbrace{\frac{\Delta_i}{\Omega_i}\ldots\frac{\Delta_m}{\Omega_m}}_{2n+1\,times} = 0$$

Reference is now made to FIG. 2, which has top and bottom graphs. The top graph shows fidelity of the detuning-modulated composite sequences vs errors in the pulse area $\delta A/A$, according to embodiments of the present invention. Fidelity of the first-order CPs is shown with N=2, 3 (green 16, red 18) constituent pulses, and of the second-order sequence with N=3 (blue 20). The lower graph shows fidelity of the CPs from (top) with (dashed curves) and without (solid curves) Gaussian errors of 10% in A averaged over 100 times. The fidelity of a resonant pulse is shown in black 22. The same numbers are used in the top and bottom graphs for corresponding plots.

Thus, a robust composite sequence that corrects for imperfections in the pulse area exhibits the signature flat-top profile at $A=\pi$ as shown in FIG. 2 (top). We achieve this by taking the partial derivatives of the off-diagonal element from Eq. (3), $$\frac{\partial^k}{\partial A^k}\left|U_{12}^{(N)}(T, 0)\right|^2$$

at $A=\pi$ and consecutively nullifying them (k=1, 2, ...). The odd derivatives are always equal to zero and thus for a first-order CP we need to nullify the second derivative, while for a second-order CP—the second and the fourth derivatives simultaneously. Note, that the pulse area A for an off-resonant pulse is a function of all systematic parameters pulse duration, amplitude, and detuning and thus, the detuning modulated composite pulses presented here are robust against all systematic errors by design.

In the following we provide analytical solutions for broadband pulse sequences of arbitrary lengths N with equal couplings ($\Omega_n=\Omega$) by utilizing symmetry rules for the detuning values of the individual pulses. The presented sequences may be straightforward to realize in NMR and in coupled waveguides qubits. We note that other sets of solutions that do not fulfil the given symmetry rules exist and can be obtained by numerically nullifying the partial derivatives. However, this task proves computationally challenging even for short composite sequences of length N=3 due to the complicated form of the propagator element and its derivatives. Thus, the uncovered pulse symmetries represent a powerful analytical quantum control tool and allow finding sequences of arbitrary lengths in a straightforward manner.

First-Order Composite Pulses: Sign-Alternating $\Delta$.

We consider individual detuning parameters that are equal in magnitude and alternating in sign, i.e., $\Delta_i=\Delta_{i+1}\equiv A$ for i=(1, ..., N−1). Then, the CPT conditions Eqs. (4) and (5) can be combined and rewritten as the polynomial $$\sum_{s=0}^{n}(-1)^s\Omega^{2s}\binom{N}{N-2s}\Delta^{N-2s} = 0 \qquad (6)$$

which is valid for both even N=2n and odd N=(2n+1) sequences. The roots of this polynomial provide the values of $\Delta$ for which a complete bit flip is achieved and moreover $$\frac{\partial^k}{\partial A^k}\left|U_{12}^{(N)}\right|^2 \text{ at } A = \pi$$

is nullified. For a flat-top broadband composite sequence we choose the root that minimizes the fourth derivative $$\frac{\partial^k}{\partial A^4}\left|U_{12}^{(N)}\right|^2$$

at $A=\pi$ where the polynomial is a symmetric function of $\Delta$. Finally, we find that first-order detuning-modulated CPs of arbitrary lengths N with sign-alternating detunings are implemented for $\Delta$ given by the largest root, in absolute value, of the polynomial Eq. (6).

As an example, we consider the shortest detuning modulated composite pulse which has only 2 constituent pulses with durations $$\delta t_i = \pi/\sqrt{\Omega^2 + \Delta_i^2}$$

(i=1, 2). Eq. (6) is simply $\Omega^2-\Delta^2=0$ whose roots $\Delta=\pm\Omega$ realize the shortest broadband sequence. Similarly, given the general solution in Eq. (6) it is easy to find sequences of any length N and in the table below we present several examples for N=3, 4, and 5.

| First-order detuning-modulated CPs | |
|---|---|
| N | $\pm (\Delta, -\Delta, \Delta, -\Delta, \ldots)/\Omega$ |
| 2 | (1, −1) |
| 3 | (1, −1, 1) √3 |
| 4 | (1, −1, 1, −1) 2.4142 |
| 5 | (1, −1, 1, −1, 1) 3.0776 |

Second-Order Composite Pulses: Anti-Symmetric $\Delta$.

To achieve higher fidelity of the CPs we need to additionally nullify the fourth derivative of the off-diagonal propagator element. We consider odd composite sequences, N=(2n+1), and detuning values that are equal and anti-symmetric with respect to the length of the pulse. That is, $\Delta_i=-\Delta_{N+1-i}\equiv\Delta$ while the detuning of the middle pulse is $\Delta_{n+1}=0$. This anti-symmetric arrangement fulfils the CPT condition Eq. (5) automatically and similarly to the first-order CPs, the second derivative is zero as it is proportional to the diagonal element of the propagator. For second-order CPs we need to find detuning values that nullify the fourth derivative and minimize the sixth. This task is considerably simpler as compared to when we do not adopt the anti-symmetric detunings rule. In the table below we present the shortest second-order detuning-modulated CP sequence of length N=3 and also the sequences with N=5, 7 and 9. We note that these results can easily be extended to large odd lengths N.

| Second-order detuning-modulated CPs | |
|---|---|
| N | $\pm(\Delta, -\Delta, \ldots, 0, \ldots, \Delta, -\Delta)/\Omega$ |
| 3 | (1, 0, −1) 2.5425 |
| 5 | (1, −1, 0, 1, −1) 5.09027 |
| 7 | (1, −1, 1, 0, −1, 1, −1) 7.6375 |
| 9 | (1, −1, 1, −1, 0, 1, −1, 1, −1) 10.1845 |

The fidelities and infidelities in log scale of the first- and second-order detuning-modulated composite sequences as a function of the individual pulse area error $\delta A/A$ are apparent from FIG. 2. For easy reference we also plot the fidelity and infidelity of a resonant pulse 22 and the QI gate error threshold of $10^{-4}$. The presented composite sequences are very robust against pulse area errors and the infidelity of the population transfer is well below the QI benchmark even for $\delta A/A$ larger than $10^{-1}$ as compared to less than $10^{-2}$ for single-pulse resonant excitation. We achieve almost an order of magnitude increase in the error tolerance by adding only one additional pulse (first-order CP), and 1.5 orders of magnitude increase by adding two pulses (second-order CP). Note that the first-order pulses in FIG. 2 (green 16 and red 18 curves) have similar robustness as they nullify the second derivative of the propagator element, while the second-order pulse with N=3 (blue curve 20) nullifies the fourth derivative as well. The pulse overhead for our pulses scales as N which is significantly better than that of previous proposals, where it is 2N for N derivatives nullified. This makes our sequences preferable for applications in QIP. In our analysis we also allowed for Gaussian errors of 10% in the individual pulse lengths and averaged over 100 times (with dashed curves in the bottom frame). We note that the error correction of our CPs is largely unaffected by such inaccuracies.

We examine the robustness of the detuning-modulated composite sequences vs errors in the Rabi frequency and target detuning values.

Reference is now made to FIGS. 3(a)-3(c) which show robustness of first- and second-order detuning-modulated sequences vs errors in the coupling and detuning. FIG. 3(a) shows contour plots of the fidelity of CPT for N=3 sequences as a function of errors in the detuning $\delta\Delta i/\Delta i$ and the coupling $\delta\Omega/\Omega$. FIG. 3(b) shows horizontal cut lines from (a) for first-order (red curve 24) and second-order (blue curve 26) sequences. FIG. 3(c) is similar to FIG. 3(b) and shows vertical cut lines from FIG. 3(a). For easy reference, the fidelity of a single resonant pulse is shown in black 28.

In FIG. 3 (a) we present the contour plots of CPT for first-order (left) and second-order (right) CPs of length N=3. We note that the contour plots for any other pulses from their respective families look similar. For comparison, we show with black ovals 30 the area with fidelity above 90% (dark red) of a resonant pulse. By design, our pulses are robust to inaccuracies in the coupling and detuning parameters thus, the area of the parameter space where the fidelity is above 90% is increased significantly. Furthermore, from the contour plots we find areas in the parameter space (horizontal dashed white lines) where errors in $\delta\Delta_i/\Delta$ leave the population fidelity largely unaffected. We plot the horizontal cut lines in log scale in FIG. 3 (b) for the first- and second order CPs (red 24 and blue 26 curves, respectively) compared to the resonant profile shown in black. Similarly, in FIG. 3 (c) we present the vertical cut lines from (a) that exhibit notable stability against errors in the coupling strength, $\delta\Omega/\Omega$. The presented analysis shows that the derived detuning-modulated sequences are a powerful tool for robust qubits inversion in the presence of any experimental parameter deviation, e.g., pulse duration, pulse amplitude, unwanted detunings, Stark shifts, unwanted frequency chirp, etc.

Realization in Coupled Waveguides.

The detuning-modulated CPs as described above allow for error tolerance in qubit inversions and are suited for implementation in integrated photonic circuits. These pulses thus offer a solution to overcome inaccuracies in fabrication and provide a path for true high-fidelity quantum information processing schemes. In the following, we provide an implementation of CPs according to the present embodiments in directional couplers, which serve as a building block for QIP. As shown in FIG. 1(b), the two evanescently-coupled optical waveguides 12 and 14 are shown set apart at a constant distance g measured from their centerlines. Within the coupled-mode theory approximation, the amplitudes of the fundamental modes in the waveguides obey an equation analogous to Eq. (1) where the coupling is $\Omega=ae^{-bg}$ with a and b being parameters that depend on the material and geometry. As g is fixed, $\Omega$ is also fixed during the entire evolution. The system is at resonance if the waveguides have identical geometry, otherwise there is a real-valued phase mismatch equal to the difference between their respective propagation constants $\beta_i$, i.e., $\Delta=(\beta_1-\beta_2)/2$.

Thus, it is straightforward to implement our sequences by sequentially changing the waveguides' relative widths such that there are phase jumps in the values of $\Delta$.

With reference to FIGS. 4(a) to 4(c) we present an out-of-scale schematic of the first-order detuning-modulated CP, with N=2 in coupled waveguides 30-1 and 30-2 in FIG. 4 (a). The width of waveguide 30-1, $\omega 1$, is fixed, while the width of waveguide 30-2 changes mid-length from $1.034\omega 1$ to $0.966\omega 1$, which realizes the required phase mismatch change in the specific Si on SiO$_2$ configuration that we considered. We perform a calculation by employing an Eigenmode expansion (EME) solver to simulate the light propagation along the two waveguides with total length 2L. We plot the light intensity of waveguides 30-1 and 30-2 in FIG. 4 (*b*). We observe complete light switching at the end of the coupler and study its robustness as a function of the phase mismatch error $\delta\Delta/\Delta$ and the propagation length error $\delta L/L$ as compared to their target values. We show the results in FIG. 4 (*c*) and observe high fidelity light transfer even in the presence of errors, in excellent agreement with the theoretical calculations from FIGS. 2 and 3(*a*)-(*c*).

In more detail, FIGS. 4(*a*)-4(*c*) show complete light transfer in first-order N=2 detuning-modulated composite coupled waveguides. FIG. 4(*a*) is an out-of-scale schematic with EME calculation. In FIG. 4(*b*) the light intensity is shown vs the normalized propagation length. FIG. 4(*c*) shows fidelity of the light transfer vs errors in the target phase mismatch and propagation length values.

We present the implementation in coupled waveguides of the first- and second-order detuning-modulated CPs with N=3 in FIGS. 5(*a*)-(*c*). The length of the separate propagation regions are calculated according to $$l = \pi/\sqrt{\Omega^2 + \Delta^2}.$$

For the first-order CP implementation FIG. 5 (*a*) these are equal while the width of waveguide 2 changes as $1.057\omega_1$, $0.943\omega_1$, and $1.057\omega_1$. In FIG. 5(*b*) we show the second-order CPs implemented where the width of waveguide 2 changes as $1.107 \omega_1$, $\omega_1$ and $0.893\omega_1$. In a similar fashion, any first-order and second-order composite sequence can be easily realized in a directional waveguide coupler for high-fidelity robust light switching.

More particularly, FIGS. 5(*a*)-5(*c*) show realizations of first- and second-order detuning-modulated CPs with N=3 in coupled waveguides. FIG. 5(*a*) shows the light intensity vs the normalized propagation length for a (solid lines) first-order sequence and (dashed lines) second-order sequence. FIG. 5(*b*) shows an out-of-scale schematic for the first-order sequence, and FIG. 5(*c*) is the same as FIG. 5(*b*) for the second-order sequence.

Realization in Coupled Waveguide Systems

Scalable components with high fidelity and robustness to fabrication and systematic errors may provide commercially useable components. One such component that demonstrated is an efficient coupler, seen in FIGS. 6(*a*)-(*c*) and FIGS. 7(*a*)-(*c*). In this physical configuration, the coupling is set by the separation between two waveguides, the detuning (phase mismatch) is governed by the difference in the geometry of each waveguide and the pulse area is determined by the length of each composite segment.

Namely, in FIG. 6(*a*), we show two evanescently coupled optical waveguides at a distance g measured from their centerlines. Within the coupled-mode approximation, the amplitudes of the fundamental modes in the waveguides obey an equation analogous to the Schrodinger equation referred to above, namely:

$$i\hbar\partial_t \begin{bmatrix} c_1(t) \\ c_2(t) \end{bmatrix} = \frac{\hbar}{2} \begin{bmatrix} -\Delta(t) & \Omega(t) \\ \Omega^*(t) & \Delta(t) \end{bmatrix} \begin{bmatrix} c_1(t) \\ c_2(t) \end{bmatrix}$$

12 where the coupling is $\Omega = ae^{-bg}$ (a and b are material/geometry dependent). For constant g, the coupling is also constant throughout the propagation length. The system is considered at resonance if the waveguides have identical geometries, otherwise there is a real valued phase mismatch $\Delta = (\beta_1 - \beta_2)/2$ with $\beta_i$ being the respective propagation constants. Thus, the pulse sequences of the present embodiments may be implemented by changing the waveguides' widths such that there are step changes in $\Delta$ along the length.

Detuning-modulated CPs allow for minimal pulse overhead, which translates to shorter component lengths (from N=2). Thus, functionality does not depend strongly on the total length, allowing for compact, minimal-footprint devices. Moreover, detuning-modulated CPs allow for straightforward scaling for any arbitrary N-piece sequence, and enabling for scalable components.

The general scheme for designing a two-waveguide coupler is shown in FIGS. 6(*a*)-6(*c*) for a Si on SiO$_2$ waveguide system. FIGS. 6(*a*) to 6(*c*) show the coupling parameter as a function of the distance between the waveguides' centerlines, g, for such a system with base widths of w=220 nm and height h=340 nm for each waveguide. In order to calculate the coupling, we employed a FDTD Comsol Multiphysics simulation on the coupled system while sweeping g. In FIGS. 7(*a*)-7(*c*), the steps taken to calculate the detuning parameter are shown. First, we employed the FDTD simulation on a single waveguide with the above parameters, while sweeping its width, w, in order to calculate the propagation constant as a function of the width. Next, we calculated the detuning of the coupled waveguide system as a function of the difference in the waveguides' respective widths. That is to say, FIGS. 6(*a*) to 7(*c*) are a flow chart for determining the geometrical parameters demanded for specific couplings (a) and detunings (b) of a detuning-modulated coupled waveguide system. All calculations are performed via a FDTD Comsol Multiphysics simulation.

Thus FIG. 4(*a*) shows a coupler for quantum information processing which has a laser input 32, a first waveguide 30-1 having a lengthwise direction and a constant cross-section along the lengthwise direction. There is also a second waveguide 30-2 having a lengthwise direction and a cross-section along the lengthwise direction having one or more step changes as variously shown in FIGS. 8(*a*)-8(*d*). The waveguides are optically coupled with a predetermined coupling constant which is arrived at by defining the distance between the two waveguides, g in FIG. 1(*b*).

Finally a detector 36 detects output.

In order to fabricate the photonic systems, we provide the geometrical parameters required to design robust Si on SiO$_2$ waveguide couplers for input wavelengths of $\lambda$=1310 nm and $\lambda$=1550 nm. Specifically, the following examples of Si on SiO$_2$ two, three and four-piece 1st-order, and a three-piece 2nd-order detuning-modulated waveguide system are described in FIGS. 8(*a*)-(*d*) and the following tables.

Referring now specifically to FIGS. 8(*a*)-(*d*), and the geometric layouts of (a) N=2-piece 1st-order (b) N=3 1st-order (c) N=3 2nd-order and (d) N=4 1st-order coupled waveguide systems. L$_i$ are the lengths of each segment i, $w_{left_i(right_i)}$ are the widths of the left (right) waveguides of each segment, and g$_i$ are the edge-to-edge distances between each coupled waveguides in each segment.

TABLE 1

Geometric parameters of coupled waveguide system with base
height of h = 220 nm and input wavelength of 1310
nm. Grating pitch optimized for TM mode coupling is 0.77 um.

| | N = 2 (1st) | N = 3 (1st) | N = 3 (2nd) | N = 4 (1st) |
|---|---|---|---|---|
| L1[um] | 2.76E−05 | 0.00002 | 1.42E−05 | 1.57E−05 |
| w_left1[um] | 3.40E−07 | 3.40E−07 | 3.40E−07 | 3.40E−07 |
| w_right1[um] | 3.50E−07 | 3.58E−07 | 3.68E−07 | 3.66E−07 |
| g1[um] | 4.45E−07 | 4.41E−07 | 4.36E−07 | 4.37E−07 |
| L2[um] | 2.76E−05 | 0.00002 | 3.88E−05 | 1.57E−05 |
| w_left2[um] | 3.40E−07 | 3.40E−07 | 3.40E−07 | 3.40E−07 |
| w_right2[um] | 3.30E−07 | 3.22E−07 | 3.40E−07 | 3.14E−07 |
| g2[um] | 4.55E−07 | 4.59E−07 | 4.50E−07 | 4.63E−07 |
| L3[um] | | 0.00002 | 1.42E−05 | 1.57E−05 |
| w_left3[um] | | 3.40E−07 | 3.40E−07 | 3.40E−07 |
| w_right3[um] | | 3.58E−07 | 3.12E−07 | 3.66E−07 |
| g3[um] | | 4.41E−07 | 4.64E−07 | 4.37E−07 |
| L4[um] | | | | 1.57E−05 |
| w_left4[um] | | | | 3.40E−07 |
| w_right4[um] | | | | 3.14E−07 |
| g4[um] | | | | 4.63E−07 |

TABLE 2

Geometric parameters of coupled waveguide system with base
height of h = 340 nm and input wavelength of 1310 nm.
Grating pitch optimized for TM mode coupling is 0.731 um.

| | N = 2 (1st) | N = 3 (1st) | N = 3 (2nd) | N = 4 (1st) |
|---|---|---|---|---|
| L1[um] | 1.28E−05 | 9.52E−06 | 6.88E−06 | 7.49E−06 |
| w_left1[um] | 2.20E−07 | 2.20E−07 | 2.20E−07 | 2.20E−07 |
| w_right1[um] | 2.28E−07 | 2.33E−07 | 2.44E−07 | 2.38E−07 |
| g1[um] | 2.96E−07 | 2.94E−07 | 2.88E−07 | 2.91E−07 |
| L2[um] | 1.28E−05 | 9.52E−06 | 1.88E−05 | 7.49E−06 |
| w_left2[um] | 2.20E−07 | 2.20E−07 | 2.20E−07 | 2.20E−07 |
| w_right2[um] | 2.13E−07 | 2.08E−07 | 2.20E−07 | 2.03E−07 |
| g2[um] | 3.04E−07 | 3.06E−07 | 3.00E−07 | 3.09E−07 |
| L3[um] | | 9.52E−06 | 6.88E−06 | 7.49E−06 |
| w_left3[um] | | 2.20E−07 | 2.20E−07 | 2.20E−07 |
| w_right3[um] | | 2.33E−07 | 1.97E−07 | 2.38E−07 |
| g3[um] | | 2.94E−07 | 3.12E−07 | 2.91E−07 |
| L4[um] | | | | 7.49E−06 |
| w_left4[um] | | | | 2.20E−07 |
| w_right4[um] | | | | 2.03E−07 |
| g4[um] | | | | 3.09E−07 |

TABLE 3

Geometric parameters of coupled waveguide system with base
height of h = 340 nm and input wavelength of 1550
nm. Grating pitch optimized for TM mode coupling is 0.87 um.

| | N = 2 (1st) | N = 3 (1st) | N = 3 (2nd) | N = 4 (1st) |
|---|---|---|---|---|
| L1[um] | 1.28E−05 | 8.65E−06 | 6.57E−06 | 6.73E−06 |
| w_left1[um] | 2.20E−07 | 2.20E−07 | 2.20E−07 | 2.20E−07 |
| w_right1[um] | 2.31E−07 | 2.40E−07 | 2.51E−07 | 2.49E−07 |
| g1[um] | 3.25E−07 | 3.20E−07 | 3.15E−07 | 3.16E−07 |
| L2[um] | 1.28E−05 | 8.65E−06 | 1.80E−05 | 6.73E−06 |
| w_left2[um] | 2.20E−07 | 2.20E−07 | 2.20E−07 | 2.20E−07 |
| w_right2[um] | 2.09E−07 | 2.00E−07 | 2.20E−07 | 1.91E−07 |
| g2[um] | 3.36E−07 | 3.40E−07 | 3.30E−07 | 3.45E−07 |
| L3[um] | | 8.65E−06 | 6.57E−06 | 6.73E−06 |
| w_left3[um] | | 2.20E−07 | 2.20E−07 | 2.20E−07 |
| w_right3[um] | | 2.40E−07 | 1.89E−07 | 2.49E−07 |
| g3[um] | | 3.20E−07 | 3.46E−07 | 3.16E−07 |
| L4[um] | | | | 6.73E−06 |
| w_left4[um] | | | | 2.20E−07 |
| w_right4[um] | | | | 1.91E−07 |
| g4[um] | | | | 3.45E−07 |

TABLE 4

Geometric parameters of coupled waveguide system with base
height of h = 220 nm and input wavelength of 1550
nm. Grating pitch optimized for TM mode coupling is 0.93 um.

| | N = 2 (1st) | N = 3 (1st) | N = 3 (2nd) | N = 4 (1st) |
|---|---|---|---|---|
| L1[um] | 6.22E−05 | 4.31E−05 | 3.19E−05 | 3.60E−05 |
| w_left1[um] | 5.00E−07 | 5.00E−07 | 5.00E−07 | 5.00E−07 |
| w_right1[um] | 5.14E−07 | 5.24E−07 | 5.37E−07 | 5.30E−07 |
| g1[um] | 7.93E−07 | 7.88E−07 | 7.82E−07 | 7.85E−07 |
| L2[um] | 6.22E−05 | 4.31E−05 | 8.70E−05 | 3.60E−05 |
| w_left2[um] | 5.00E−07 | 5.00E−07 | 5.00E−07 | 5.00E−07 |
| w_right2[um] | 4.86E−07 | 4.76E−07 | 5.00E−07 | 4.70E−07 |
| g2[um] | 8.07E−07 | 8.12E−07 | 8.00E−07 | 8.15E−07 |
| L3[um] | | 4.31E−05 | 3.19E−05 | 3.60E−05 |
| w_left3[um] | | 5.00E−07 | 5.00E−07 | 5.00E−07 |
| w_right3[um] | | 5.24E−07 | 4.63E−07 | 5.30E−07 |
| g3[um] | | 7.88E−07 | 8.19E−07 | 7.85E−07 |
| L4[um] | | | | 3.60E−05 |
| w_left4[um] | | | | 5.00E−07 |
| w_right4[um] | | | | 4.70E−07 |
| g4[um] | | | | 8.15E−07 |

Returning now to FIGS. 4($a$)-($c$) and we see an exemplary experimental set-up and demonstration of robustness. FIG. 4($a$) illustrates an input 32 with a CW laser and light intensity $I_1$ of $\lambda$=1310 nm which is grating-coupled at 34 into a detuning-modulated N=2-piece 1st order coupled waveguide system made up of the waveguides 30-1 and 30-2. The output light intensity $I_2$ is grating-coupled out of the system at 34 into a detector 36. In FIG. 4($b$) the intensity of light in each waveguide is shown as a function of propagation distance. In FIG. 4($c$) the normalized fidelity of the output signal as a function of relative deviation from the target values of the segment lengths $L_i$ and detuning values $\Delta_i$ is characterized by the segment widths $w_i$.

The present embodiments introduce a set of detuning modulated composite pulse sequences that are characteristically robust to inaccuracies in the systematic parameters including duration, coupling strength and off-resonance errors of the interaction. The control knobs, which we utilize to achieve broadband population inversion, are the detuning parameters of the constituent pulses, while we allow for real coupling constants. The present embodiments may achieve an inversion gate fidelity above the QI threshold vs errors of several percents in the pulse area for a sequence of only 2 constituent pulses, and vs errors of over 10% for 3 constituent pulses. Furthermore, we show that the presented sequences are inherently robust to errors in the detuning and coupling parameters. The composite pulses differ from existing composite sequences, which assume complex coupling parameters and modify their phases, and thus cannot be applied to quantum information. Thus, the present embodiments may provide quantum information protocols and in particular may be well-suited for practical realization of high-fidelity quantum computing in integrated photonic circuits.

Referring now to FIG. 9, a flow chart illustrates features of a method according to the present embodiments for state transfer in quantum information processing. The method comprises obtaining 40 a beam, say from a CW laser. The two waveguides are optically coupled to each other 42 and have different geometries respectively. Thus for example one of the waveguides has a constant cross section along its length and the other waveguide has step changes in the cross section. The beam is then provided 44 to the optically coupled waveguides to detune the beam, and the detuning is a function of the respectively different geometries. If the two waveguides were of perfectly identical geometry the coupling would be at resonance, so that the different shapes provide off-resonance detuning. The modulated geometry may provide reliable population transfer between the first and second waveguides and preserve quantum states. Thus the two waveguide structure may provide a waveguide coupler.

The detuning may provide one or more control parameters, and the control parameter or parameters may be used to control quantum state preparation and population transfer and keep the transfer within a preset quantum error threshold.

The beam may use composite pulses to control for systematic errors.

The composite pulses may provide quantum gates.

The use of detuning may, as mentioned, result in significant reduction of errors and thus parameters may be set which would allow for carrying out the state transfer at room temperature.

The coupling may be set between the two waveguides as a function of the distance between two waveguides.

The cross section along the second waveguide lengthwise axis may include one, two, three or more step changes. The number of different cross-sections along the second waveguide may set the order N, as shown in FIGS. 8(a)-(d).

The step changes may be at predetermined locations along the second waveguide, as shown by the different lengths L1, L2, L3, L4 in FIGS. 8(a)-(d), and the lengths are set to define pulse areas. The constructions may provide beams which are detuned, modulated and pulsed.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A coupler for quantum information processing, the coupler comprising:
   a laser input;
   a first waveguide having a lengthwise direction and a cross-section along said lengthwise direction;
   a second waveguide having a lengthwise direction and a cross-section along said lengthwise direction having at least one step change, wherein said first and second waveguides are optically coupled with a predetermined coupling constant;
   a detector for detecting output; and
   at least one member of the group consisiting of:
   a first grating between said input and said first and second waveguides; and
   a second grating between said first and second waveguides and said detector.

2. The coupler of claim 1, wherein said step change comprises a plurality of step changes.

3. The coupler of claim 1, wherein said step change or changes are at predetermined locations along said second waveguide, said predetermined location being selectable for any given material or geometry.

4. The coupler of claim 3, wherein said coupling constant is defined by a distance between said first and said second waveguides.

5. The coupler of claim 1, wherein lengths between each step change define a pulse area of a beam provided by said laser.

* * * * *